(12) United States Patent
Talarico et al.

(10) Patent No.: US 11,696,224 B2
(45) Date of Patent: *Jul. 4, 2023

(54) PBCH CONTENT FOR NR UNLICENSED

(71) Applicant: Apple Inc., Cupertino, CA (US)

(72) Inventors: Salvatore Talarico, Sunnyvale, CA (US); Carlos Aldana, Santa Clara, CA (US); Bishwarup Mondal, San Ramon, CA (US); Jeongho Jeon, San Jose, CA (US); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,929

(22) Filed: Jan. 25, 2022

(65) Prior Publication Data

US 2022/0150802 A1 May 12, 2022

Related U.S. Application Data

(63) Continuation of application No. 16/515,704, filed on Jul. 18, 2019, now Pat. No. 11,259,238.

(60) Provisional application No. 62/717,663, filed on Aug. 10, 2018, provisional application No. 62/701,390, filed on Jul. 20, 2018.

(51) Int. Cl.
*H04W 48/16* (2009.01)
*H04L 5/00* (2006.01)
*H04W 56/00* (2009.01)
*H04W 72/30* (2023.01)

(52) U.S. Cl.
CPC ........... *H04W 48/16* (2013.01); *H04L 5/0048* (2013.01); *H04W 56/001* (2013.01); *H04W 72/30* (2023.01)

(58) Field of Classification Search
CPC . H04W 48/16; H04W 56/001; H04W 72/005; H04L 5/0048
See application file for complete search history.

(56) References Cited

U.S. PATENT DOCUMENTS

| | | |
|---|---|---|
| 2017/0251499 A1 | 8/2017 | Radulescu et al. |
| 2019/0037481 A1 | 1/2019 | Zhang et al. |
| 2020/0366452 A1 | 11/2020 | Tang |

*Primary Examiner* — Kent Krueger
(74) *Attorney, Agent, or Firm* — Kowert, Hood, Munyon, Rankin & Goetzel, P.C.

(57) ABSTRACT

Systems and methods of providing timing information for initial access in an unlicensed band are described. A UE monitors a new radio discovery signal (NRDS-U) window in an unlicensed band for a DRS transmission that is constrained to be transmitted within the NRDS-U window. The UE determines initial access information, including an offset that indicates when the DRS transmission occurs within the NRDS-U window, and engages in initial access dependent on the offset. The offset is from a radio frame or half radio frame boundary or the start of the NRDS-U window. The offset is indicated in three least/most significant bits an SSB index or from an sl-offset field in a MIB of the SSB. When the base station uses a DFS channel, the base station transmits a periodic signal to emulate a radar signal.

20 Claims, 7 Drawing Sheets

PBCH CONTENT FOR NR UNLICENSED

This application is a continuation of U.S. patent application Ser. No. 16/515,704 filed on Jul. 18, 2019, which claims the benefit of priority under 35 U.S.C. 119(e) to U.S. Provisional Patent Application Ser. No. 62/701,390, filed Jul. 20, 2018, and U.S. Provisional Patent Application Ser. No. 62/717,663, filed Aug. 10, 2018, all of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to unlicensed band use in Licensed Assisted Access (LAA) systems.

BACKGROUND

The use of various types of systems has increased due to both an increase in the types of user equipment (UE) devices using network resources as well as the amount of data and bandwidth being used by various applications, such as video streaming, operating on these UEs. In particular, the introduction of a massive amount of IoT devices, in which a large number of computing devices are interconnected to each other and to the Internet to provide functionality and data acquisition at relatively low levels, has resulted in a veritable explosion in network use. To increase the ability of the network to contend with this network use, use of the unlicensed band by cellular devices and systems continues to be explored. The increased use of the unlicensed band, however, may increase device interference within the unlicensed band.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
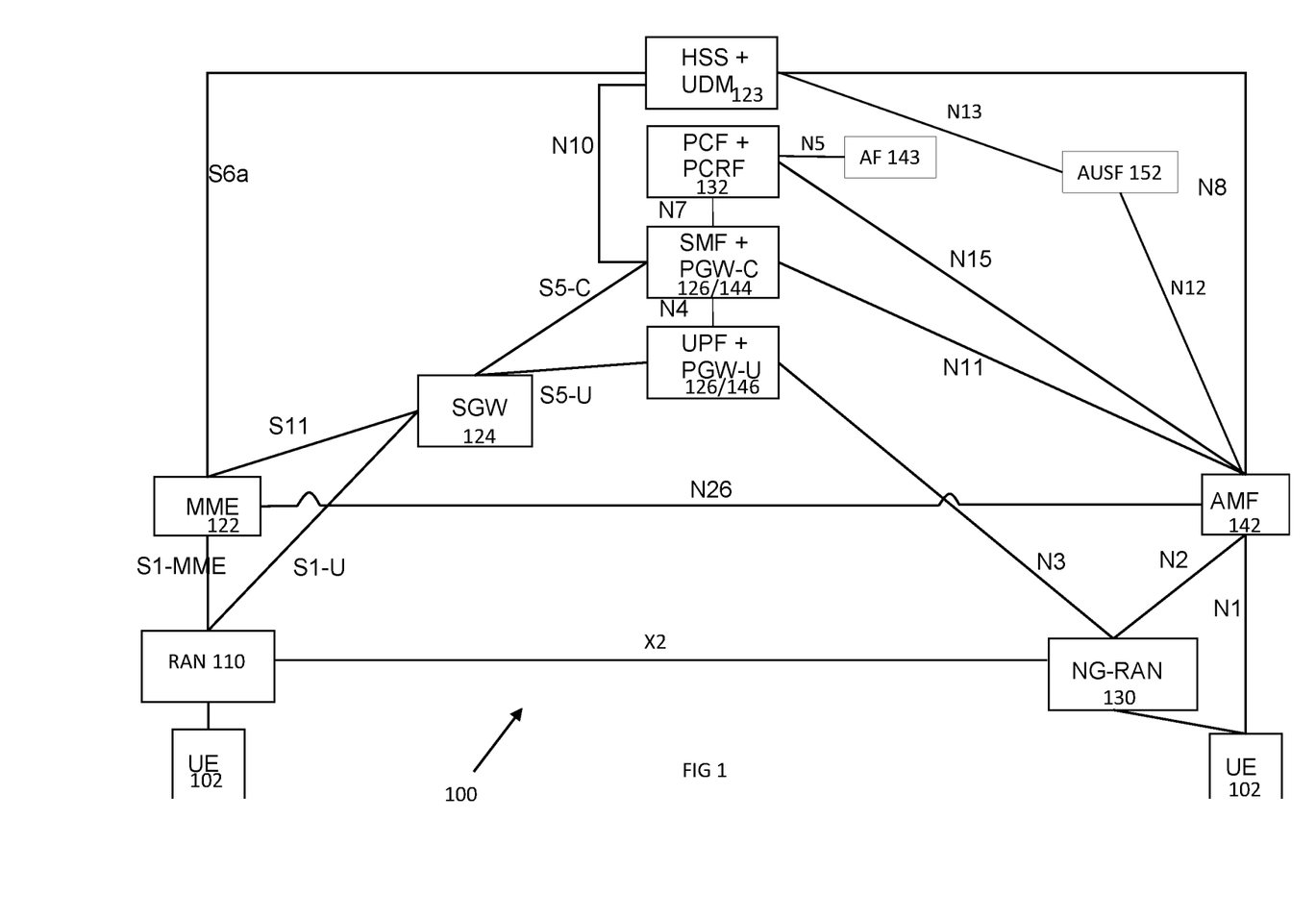
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 146 may be connected with a data network, with which the UE 102 may communicate, the UE I 02 transmitting uplink data to or receiving downlink data from the data.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
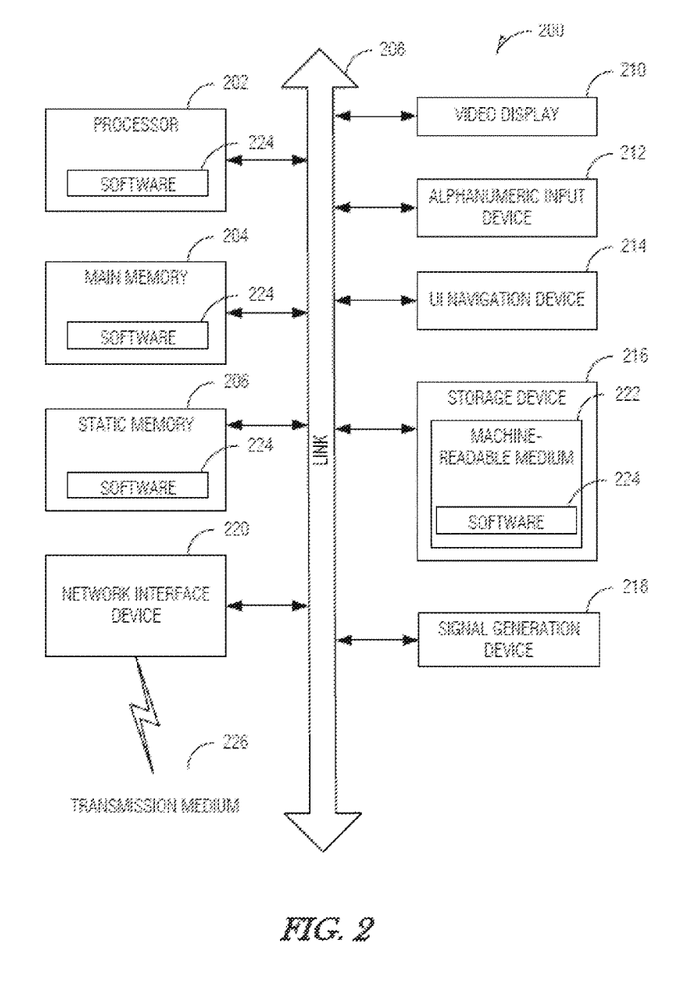
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), which may communicate with the core network via the eNB or gNB shown in FIG. 1. The IoT device may be an autonomous or semiautonomous device that performs one or more functions, such as sensing or control, among others, in communication with other IoT devices and a wider network, such as the Internet. The IoT device, in some embodiments may be limited in memory, size, or functionality, allowing larger numbers to be deployed for a similar cost to smaller numbers of larger devices. The IoT device may, in some embodiments, be a virtual device, such as an application on a smart phone or other computing device. IoT devices may include IoT gateways, used to couple IoT devices to other IoT devices and to cloud applications, for data storage, process control, and the like. IoT devices (or groups of IoT devices) may be accessible through remote computers, servers, and other systems, for example, to control systems or access data. A group or set of IoT devices that are connected to one another using wired and/or wireless technologies may be referred to as a "network of IoT devices," an "IoT network," or the like.

Networks of devices may be used for a wide variety of applications in various deployment scenarios, including commercial and home automation, and smart applications, such as factories/manufacturing, cities, environment, agriculture, and health systems. For example, networks may be used for water distribution systems, electric power distribution systems, pipeline control systems, plant control systems, light switches, thermostats, locks, cameras, alarms, motion sensors, and the like. 3GPP has standardized two designs to support IoT services—enhanced Machine Type Communication (eMTC) and NarrowBand IoT (NB-IoT). As UEs configured for NB-IoT or eMTC operation, hereinafter referred to as eMTC UEs and NB-IoT UEs, continue to be deployed in increasing numbers, lowering the cost of eMTC UEs and NB-IoT UEs may be one enabler for implementation of IoT. Also, low power consumption may be one desirable to extend the life time of the battery. In addition, in some use cases of the eMTC UEs and NB-IoT UEs may be deployed deep inside buildings. In such cases, the eMTC UEs and NB-IoT UEs may employ coverage enhancement in comparison to the defined LTE cell coverage footprint.

UEs, including Release (Rel)-13 eMTC and NB-IoT UEs, may operate in licensed spectrum but may experience a decrease in data rate due to the scarcity of licensed spectrum in low frequency band. Thus, there are emerging interests in the operation of LTE systems in unlicensed spectrum. LTE operation in unlicensed spectrum includes Carrier Aggregation (CA) based on Licensed Assisted Access (LAA)/enhanced LAA (eLAA) systems, LTE operation in the unlicensed spectrum via dual connectivity (DC), and a standalone LTE system in the unlicensed spectrum.

In addition, the use of the unlicensed bands has incorporated sharing of the 5 GHz frequency bands, which have been allocated to radar systems. However, care is to be taken to share the 5 GHz bands without causing interference to the incumbent radar. To this end, Dynamic Frequency Selection (DFS) has been developed, in which a UE may monitor the frequency used for radar signals. UEs may attempt to continuously detect radar signals on the current DFS channel for a preset amount of time, in some cases about 1 minute, before use. Some channels (120-128), the detection may be for an extended amount of time, about 10 minutes. If radar signals are not detected on the current DFS channel, the UE may designate the current DFS channel as available. If radar signals are detected on the current DFS channel, the UE may vacate the current DFS channel and switch to an alternate DFS channel. The UE may also avoid use of the channel on which radar signals were detected for a predetermined period, about 30 minutes, even if radar signals are detected on the new DFS channel.

The UE may continue to monitor the DFS channel for the presence of radar signals during operation on the DFS channel. If the UE detects a radar signal (energy) on the DFS channel, the UE may move to a new DFS channel within a channel move time of, e.g., 10 s. Prior to moving channels, the UE may transmit or receive an announcement (a "Channel Switch Announcement" 802.11 frame) to indicate to which channel the communications are to move. In response, the UE may move to any available 5 GHz channel, any available non-DFS channel or to a predetermined channel, depending on the implementation.

Radar signals are short duration pulses of RF energy that do not have a specific framing format. The characteristics of the existing Bin 5 radar are provided in Table 1, below:

TABLE 1

Table 6 - Long Pulse Radar Test Waveform

| Radar Type | Pulse Width (μsec) | Chirp Width (MHz) | PRI (μsec) | Number of Pulses per Burst | Number of Bursts | Minimum Percentage of Successful Detection | Minimum Number of Trials |
|---|---|---|---|---|---|---|---|
| 5 | 50-100 | 5-20 | 1000-2000 | 1-3 | 8-20 | 80% | 30 |

Figure 3:
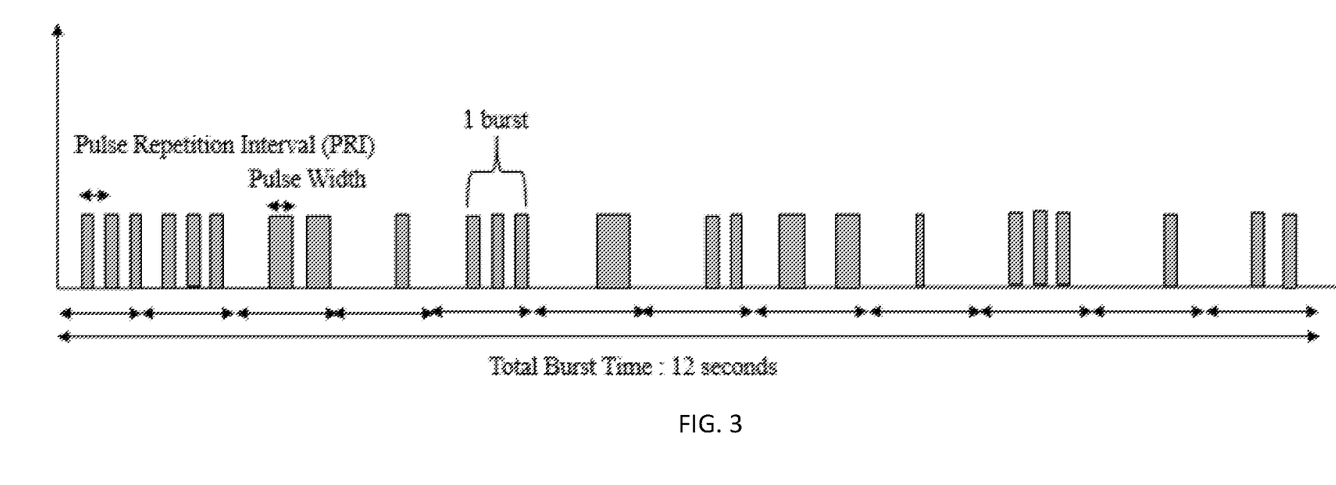
FIG. 3 illustrates an example of a Bin 5 radar signal in accordance with some embodiments.

FIG. 3 illustrates an example of a Bin 5 radar signal in accordance with some embodiments. The radar signal in FIG. 3 has 12 bursts, each is long, that have a total burst time of 12 s. Note that as the vertical axis shows energy while the horizontal axis shows time, the pulses in FIG. 3 may each extend within the chip width of 5-20 MHz (which may be different). However, because of the mutability of the radar signals, such signals may be difficult to detect.

Figure 4:
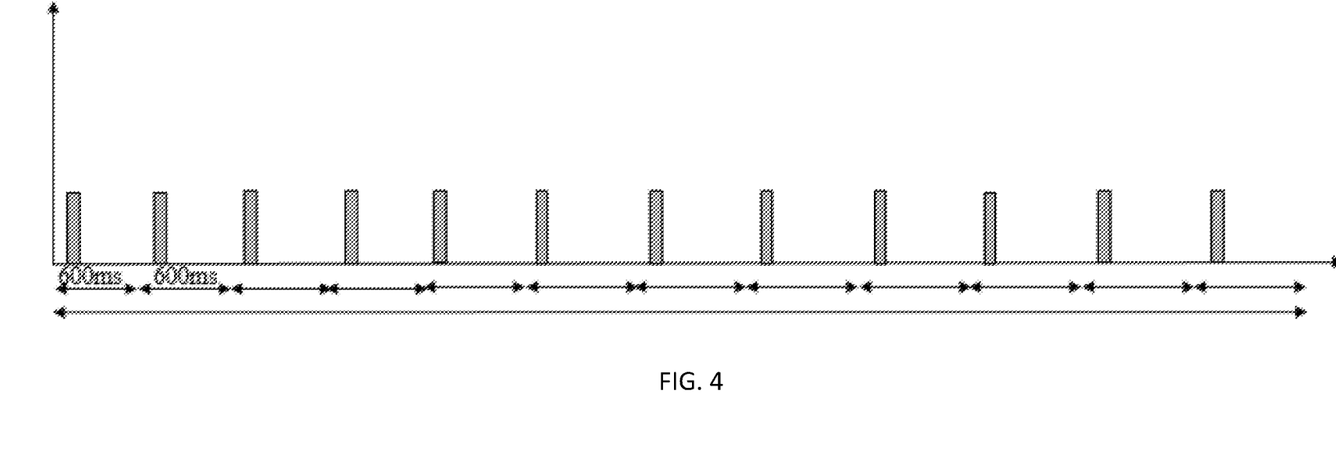
FIG. 4 illustrates an example of a pseudo-radar signal in accordance with some embodiments.

To combat this, a pseudo-radar signal may be intentionally injected into the DFS channel by a source to clear the DFS channel of certain UEs. The pseudo-radar signal may be a signal that has the characteristics of a radar signal but also have a regular, repeated pattern that makes detectability by UEs easier. Other UEs may be signaled by the source or pre-configured with pseudo-radar parameters to determine that the pseudo-radar signal is not a radar signal, and thus may not vacate the DFS channel in response to detection of the pseudo-radar signal. The parameters may include position and/or temporal location of the pulses within adjacent bursts, a sequence that forms the pulse, etc. . . . FIG. 4 illustrates an example of a pseudo-radar signal in accordance with some embodiments. As above, the vertical axis of FIG. 4 shows energy while the horizontal axis shows time. The pseudo-radar signal may be transmitted by a source such as a base station, access point, or other UE and may cause other devices (such as WiFi devices) to detect the transmissions and accordingly believe that the DFS channel is occupied. In some embodiments, the pseudo-radar signal may be transmitted once the source has determined that LBT or other contention-based mechanisms have been satisfied for the DFS channel. The pseudo-radar signal in FIG. 4 has 12 bursts, each 1 second long, that have a total burst time of 12 seconds. The pseudo-radar signal may be simple to implement and have a periodicity of at least 10 ms. The pseudo-radar signal shown in FIG. 4 may contain 20 pulses (20 bursts, 1 pulse/burst) in 12 seconds for an effective pulse repetition interval (PRI) of 600 ms. The amount of resources that are used to transmit the signal shown in FIG. 4 is: 20x/12=0.008-0.017% of medium, where x (the pulse width) is in the range between about 50 and 100 μs, similar to radar pulses as indicated in Table 1. The remaining resources of the DFS channel (between the pulses) may be used for data transmissions between the UE and base station.

Figure 5:
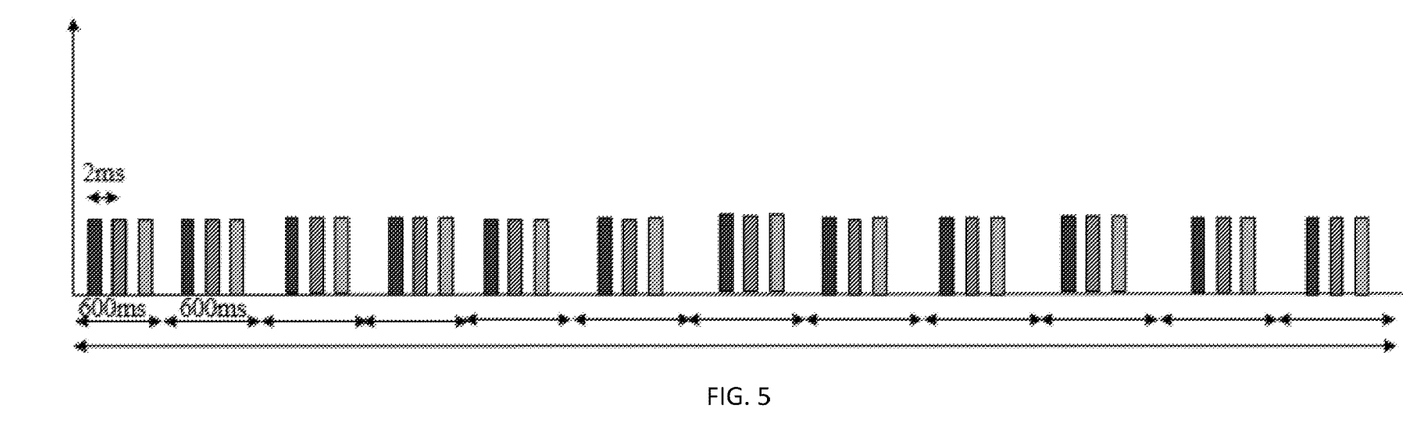
FIG. 5 illustrates an example of pseudo-radar signals from multiple sources in accordance with some embodiments.

FIG. 5 illustrates an example of pseudo-radar signals from multiple sources in accordance with some embodiments. The sources may be one or more of base stations, access points, or other UEs. As above, the vertical axis of FIG. 5 shows energy while the horizontal axis shows time. Thus, the pulses from each source may be independent: the pulses within each burst may have the same bandwidth and/or use the same DFS channel, at least one pulse may have a different bandwidth and/or DFS channel, or the pulses may have different bandwidths and/or DFS channels. Each source, as shown, may transmit a single pulse with the same PRI (shown as 600 ms) on the same frequency. The pulses from each source within the same PRI may be uniformly offset (staggered) by 1-2 ms, for example, from an adjacent source. In other embodiments, the offset of adjacent sources may be different. In some embodiments, the number of sources that each provides the pseudo-radar signal may be limited. The use of multiple base stations to transmit the pseudo-radar signals may extend the geographical range of use of the remaining.

Figure 6:
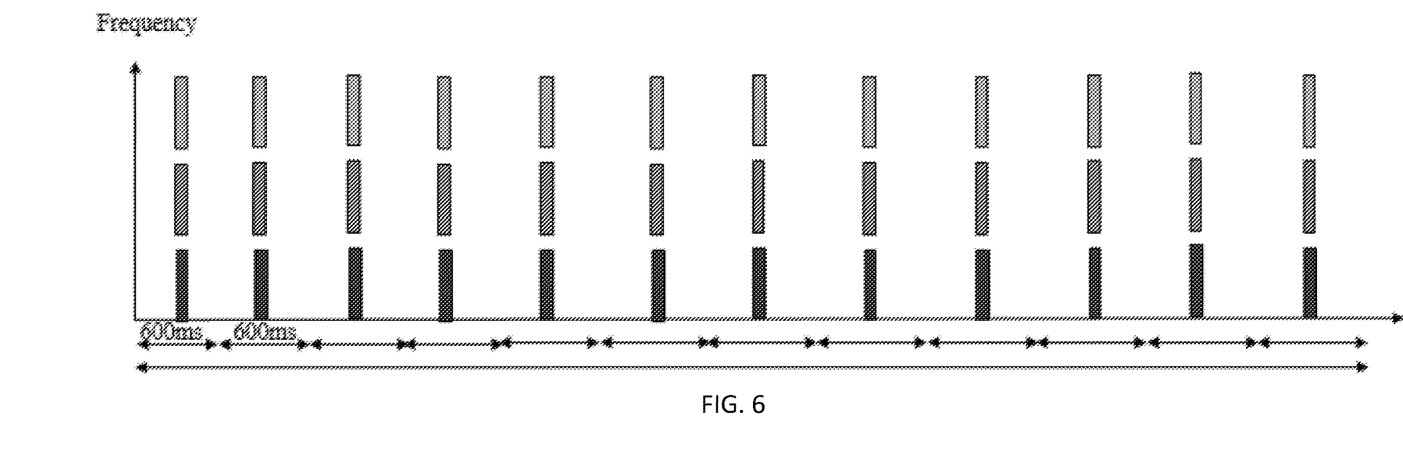
FIG. 6 illustrates another example of pseudo-radar signals from multiple sources in accordance with some embodiments.

FIG. 6 illustrates another example of pseudo-radar signals from multiple sources in accordance with some embodiments. The sources, as above, may be one or more of base stations, access points, or other UEs. Each source may transmit a single pulse with the same PRI (shown as 600 ms). However, unlike the arrangement of FIG. 5, each source may transmit on a different DFS channel (or at a minimum, at least one source may transmit on a different DFS channel than at least one other source). The pulses from each source within the same PRI may occur synchronously as shown. As above, the pulses from each source may be independent: the pulses within each burst may have the same bandwidth (as shown), at least one pulse may have a different bandwidth, or the pulses may have different bandwidths. In other embodiments, the pulses may be offset in time, similar to the embodiment shown in FIG. 5. In some embodiments, the number of sources that each provides the pseudo-radar signal may be limited.

Figure 7:
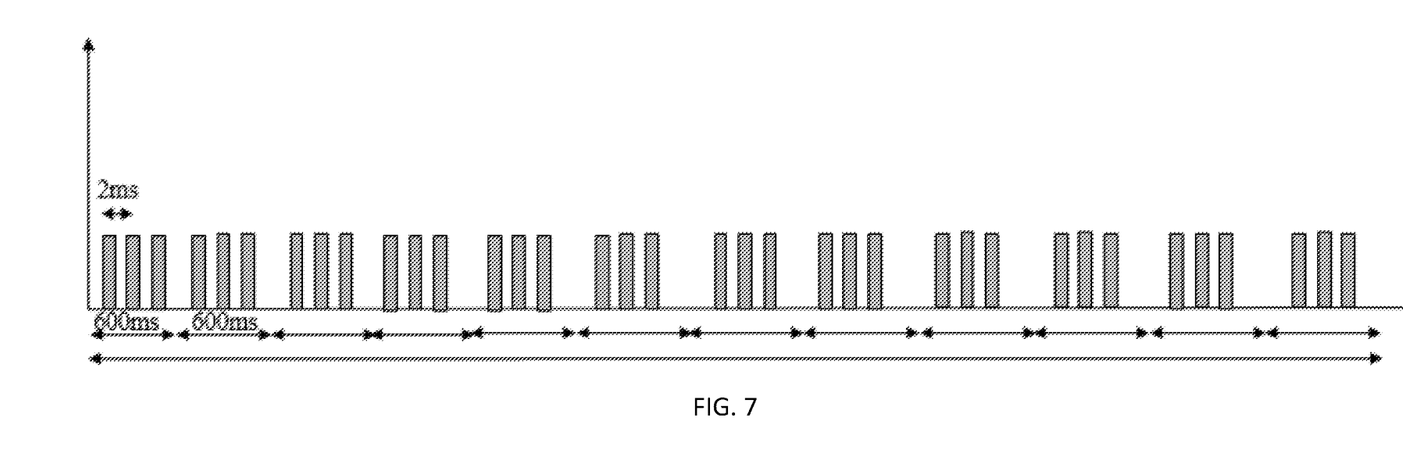
FIG. 7 illustrates another example of pseudo-radar signals from multiple sources in accordance with some embodiments.

FIG. 7 illustrates another example of pseudo-radar signals from multiple sources in accordance with some embodiments. Unlike the arrangements of FIGS. 5 and 6, a single source may transmit multiple pulses within the same PRI (again, shown as 600 ms). As shown in FIG. 7, the 60 pulses may be transmitted in 12 seconds (20 bursts, 3 pulses/burst) for an effective PRI of 200 ms. The pulses within the same PRI may be uniformly offset by 1-2 ms, for example. In other embodiments, adjacent offsets may be different. The amount of resources that are used to transmit the signal shown in FIG. 7 is: 60x/12=0.025-0.05% of medium, where x is in the range between about 50 and 100 μs. While this reduces the amount of resources able to be used for data transmission, the repetition may increase the probability of detection by devices so that the likelihood of the remaining portion of the DFS channel being clear for the data transmissions between the UE and base station increases compared to the methodology shown in FIG. 4.

In FIGS. 4-7, as long as LBT or other conflict-based resolution mechanism has been satisfied, in some embodiments one or more of the sources may continuously transmit one or more pseudo-radar pulses in each burst period. In other embodiments, one or more of the sources may continuously transmit one or more pseudo-radar pulses in each burst period only when it is determined that downlink or uplink data is to be transmitted.

As above, LAA operation may use other channels in addition to DFS channels. NR-based operation in unlicensed spectrum may include physical channels that inherit the choices of duplex mode, waveform, carrier bandwidth, sub-carrier spacing, frame structure, and physical layer design made in accordance with NR systems. Unlicensed bands below 6 GHz and above 6 GHz (up to 52.6 GHz) may be used, using similar forward compatibility principles as NR systems. In addition, initial access, channel access, scheduling/hybrid automatic repeat request (HARQ), and mobility operations including connected/inactive/idle mode operation and radio-link monitoring/failure operation may be employed on the unlicensed bands. Coexistence methods within NR-based and between NR-based operation in unlicensed and LTE-based LAA and with other incumbent radio access technologies (RATs) in accordance with regulatory requirements in e.g., 5 GHz, 37 GHz, 60 GHz bands may be used. Coexistence methods already defined for 5 GHz band in LTE-based LAA context may be assumed as the baseline for 5 GHz operation, with enhancements also being available. NR-based operation in unlicensed spectrum may not impact deployed Wi-Fi services (data, video and voice services) more than an additional Wi-Fi network on the same carrier.

Figure 8:
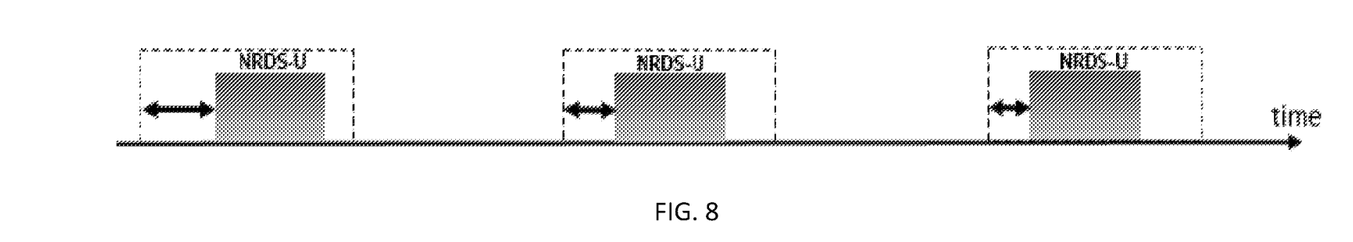
FIG. 8 illustrates an example of a new radio discovery signal (NRDS-U) window in the unlicensed band in accordance with some embodiments.

One of the challenges for NR technology operating in the unlicensed bands is for the NR system to maintain fair coexistence with other incumbent technologies. Moreover, fair coexistence may depend on the particular band in which a particular NR system operates, with different restrictions being taken into account when designing the NR system. For instance, if operating in the 5 GHz band, a listen-before-talk (LBT) procedure is performed to acquire the medium before a transmission can occur. In a NR system operating on unlicensed spectrum, since a transmission is conditional to the success of the LBT procedure, a new radio discovery signal (NRDS) window may be introduced to increase the discovery reference signal (DRS) transmission opportunity and reduce initial access delays. The NRDS-U window is a window in the unlicensed band within which the base station (eNB/gNB) has multiple opportunities to broadcast the DRS content while being subject to the LBT. In some embodiments, transmission of DRS content is constrained to occur within the NRDS-U window, which is of limited duration as indicted below; that is, the base station may avoid transmission of the DRS content outside the NRDS-U window. FIG. 8 illustrates an example of a NRDS-U window in accordance with some embodiments. Within the NRDS-U window, the base station has one or multiple DRS transmission opportunities, which occur in pre-determined instances in time within the DRS window, as illustrated in FIG. 8.

By introducing the concept of NRDS-U window, the DRS transmission instance may float in time while being constrained within the window. If no further information is provided upon detection of the DRS, the UE may not obtain the correct time synchronization with the system. Thus, a mechanism to inform the UE about the exact instance when the DRS is transmitted (that indicates the specific shifting in the time domain compared to a reference value) may be introduced.

In particular, in legacy NR systems, the synchronization signal block (SSB) that contains the primary synchronization signal (PSS)/secondary synchronization signal (SSS) and physical broadcast channel (PBCH) may be transmitted at specific instances in time, and with a given periodicity. The SSB may have an SSB index that uniquely defines the SSB. For instance, for initial cell selection a UE may assume that the SS burst period is 20 ms. For UEs in connected/idle mode, the periodicity may be configurable and can assume one of the values among the set {5, 10, 20, 40, 80, 160} ms if the network assistance information (NAI) is available. If NAI is not available, the periodicity may be set to 5 ms. Furthermore, for non-standalone cells, the periodicity with which the SS burst occurs may be configurable, and the periodicity can be one of the values among the set {5, 10, 20, 40, 80, 160} ms.

In NR, a broadcast channel (BCCH)-BCH-Message may be defined, which is the set of RRC message that may be sent from the network to the UE via BCH on the BCCH logical channel. The BCCH-BCH-Message may have the following structure:

```
BCCH-BCH-Message ::= SEQUENCE {
    message                         BCCH-BCH-
MessageType
}
BCCH-BCH-MessageType ::= CHOICE {
    mib                             MIB,
    messageClassExtensionSEQUENCE { }
}
``` where the master information block (MIB) may have the following content:

```
MIB ::=                             SEQUENCE {
    systemFrameNumber               BIT STRING (SIZE (6)),
    subCarrierSpacingCommon         ENUMERATED {scs15or60,
scs30or120},
    ssb-SubcarrierOffset            INTEGER (0..15),
    dmrs-TypeA-Position             ENUMERATED {pos2,
                                    pos3},
    pdcch-ConfigSIB1                INTEGER (0..255),
    cellBarred                      ENUMERATED {barred,
notBarred},
    intraFreqReselection            ENUMERATED {allowed,
notAllowed},
    spare                           BIT STRING (SIZE (1))
}
```

When a NR system operates in the unlicensed spectrum, a contention-based channel access procedure may be used, such as the LBT procedure. In this case, the transmission of the DRS may be conditional to the success of the LBT procedure. DRS transmission may thus depend on the congestion of the medium, and may accordingly be high detrimental in terms of initial access delay. As above, to limit the initial access delay, the DRS transmission opportunities may be increased by defining a periodic window within which a base station can perform multiple attempts. In this case, however, the DRS transmission instance may be floating in time while constrained within this defined window. Thus, if no further information is provided upon detection of the DRS, the UE might not obtain the correct time synchronization with the system. It is thus desirable to inform the UE about the exact instance when the DRS is transmitted.

In some embodiments, the window may have a duration of about 5 ms, with a periodicity of $(2^n \times 10)$ ms, where n is a non-zero integer. In some embodiment, the periodicity may be selected from 20 ms, 40 ms or 80 ms (and possibly longer periodicities). In some embodiments, the duration of the DRS transmission may be about 1 ms.

Figure 9A:
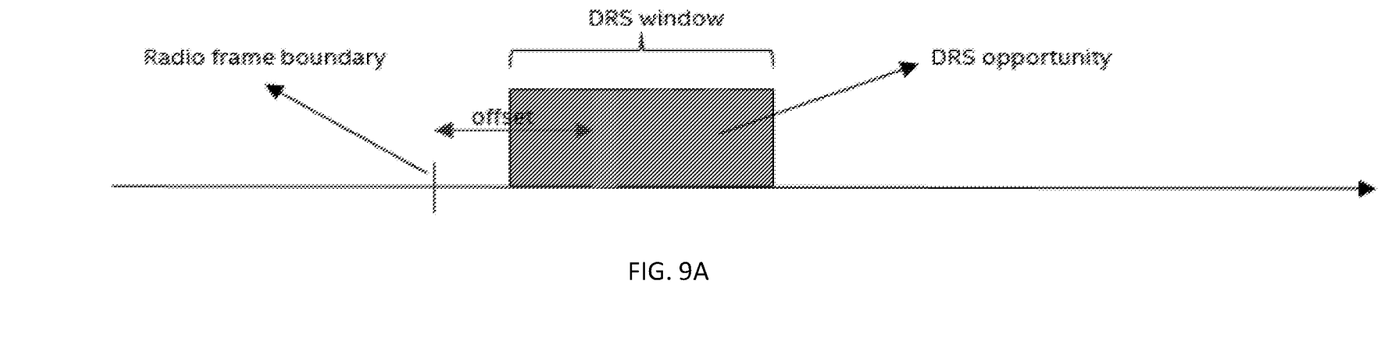
FIG. 9A illustrates an example of a NRDS-U offset in accordance with some embodiments.
Figure 9B:
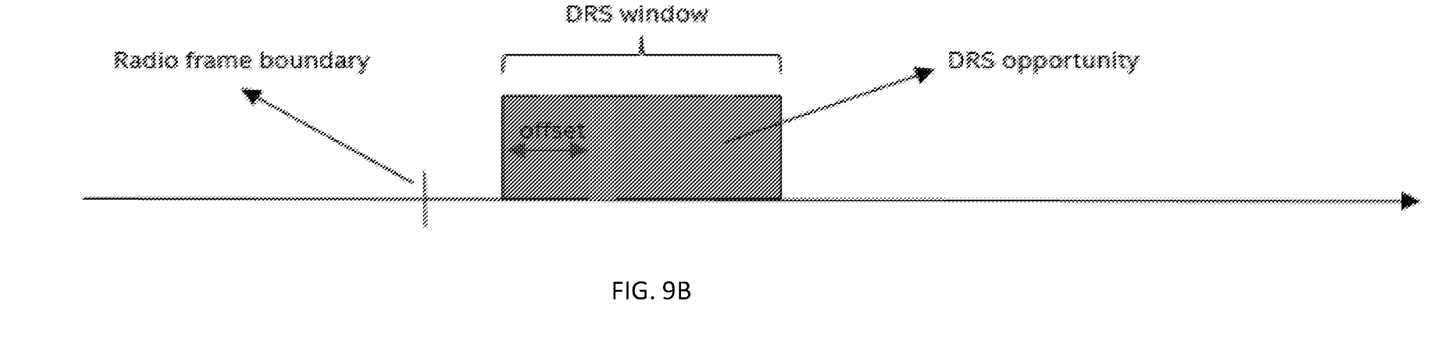
FIG. 9B illustrates another example of a NRDS-U offset in accordance with some embodiments.

In some embodiments, to signal to the UE more information to acquire correct time synchronization, and mitigate the ambiguity derived from the fact that multiple DRS occasions can occur in a DRS window but are all subject to the LBT, the PBCH content may be modified and enriched with more information. In one embodiment, a new field (called as an example "sl-offset") may be added within the MIB content. The "sl-offset" field may be a specific field designated to indicate only the offset and thus used to indicate the number of slots the DRS has been shifted from a reference position. FIG. 9A illustrates an example of a NRDS-U offset in accordance with some embodiments. FIG. 9B illustrates another example of a NRDS-U offset in accordance with some embodiments. In particular, the offset value may be evaluated using as a reference the boundary of the radio frame where the DRS is intended to be transmitted, as shown in FIG. 9A. Alternatively, the offset value may be evaluated using as a reference the boundary of the half radio frame where the SS block transmission is intended to be transmitted. In another embodiment, the offset value may be evaluated using as a reference the start of the DRS window as shown in FIG. 9B. The DRS window may occur periodically, and may either be fixed or configured via Radio Resource Control (RRC) signaling.

In some embodiments, the "sl-offset" field may be X bits, where X is, for example, 2, 4 or 8 bits. The granularity of the "sl-offset" may be either at a symbol or at a slot level. The number of DRS occasions within a DRS window may be fixed or may be configurable through RRC signaling, and their occurrence in time is known. In this case, the "sl-offset" field may indicate the specific DRS occasion, which implicitly carries an indication of when exactly the DRS transmission has occurred. For example, the DRS window may allow a maximum of 4 DRS occasions, which occur in slot #1, #2, #3, and #4 of the DRS window. By indicating whether the DRS is in the $1^{st}$, $2^{nd}$, $3^{rd}$ or $4^{th}$ DRS occasion, the time indication may also be implicitly signaled.

As an example, the MIB content can be as follows:

| | |
|---|---|
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| sl-offset | BIT STRING (SIZE (X)), |
| pdcch-ConfigSIB1 | INTEGER (0..255), |
| cellBarred | ENUMERATED {barred, notBarred}, |
| intraFreqReselection | ENUMERATED {allowed, notAllowed}, |
| spare | BIT STRING (SIZE (1)) |
| } | |

In this example, the content of the MIB may be extended by X bits. Consequently, a UE may, through blind detection, be able to differentiate between the legacy MIB and the MIB for unlicensed use. However, the UE may be able to distinguish between the newly defined MIB and the legacy MIB without performing any blind detection since the use of one or the other may be implicit on the carrier frequency adopted: in unlicensed spectrum operation, the newly defined MIB may always be used.

In some embodiments, the remaining minimum system information (RMSI) may be multiplexed in the same slot with the DRS or transmitted immediately after the DRS using the same DRS occasion within a DRS window. In this case, the CORESET frequency range configuration may not be indicated, and use of the four least significant bits for the "pdcch-ConfigSIB1" field that refers to PDCCH monitoring occasions may be avoided (similar to CORESET multiplexing patterns 2 and 3), and can be reinterpreted and allocated to indicate the exact transmission instance of the DRS. In some embodiments, the field size of "pdcch-ConfigSIB1" is INTEGER (0 . . . Y), where Y as an example can be 16.

As an example, the MIB content might be as follows:

| | |
|---|---|
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| sl-offset | BIT STRING (SIZE (X)), |
| pdcch-ConfigSIB1 | INTEGER (0..Y), |
| cellBarred | ENUMERATED {barred, notBarred}, |
| intraFreqReselection | ENUMERATED {allowed, notAllowed}, |
| spare | BIT STRING (SIZE (1)) |
| } | |

In one embodiment, if X=4 and Y=16, the MIB content may be the same as that of the legacy NR, and a UE may be unable to distinguish per se among the two MIBs. Therefore, a further indication may be used. In this context, in some embodiments a flag may be added through a selection bit in the BCCH information element (IE). In some embodiments, use of a further indication may be avoided since the use of one MIB or the other is implicit on the carrier frequency adopted: when NR operates on unlicensed spectrum operation (i.e. 5 GHz, or 6 GHz band), the newly defined MIB may always be used.

As another example, the MIB content might be as follows:

| | |
|---|---|
| MIB ::= | SEQUENCE { |
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | INTEGER (0..Y), |
| cellBarred | ENUMERATED {barred, notBarred}, |
| intraFreqReselection | ENUMERATED {allowed, notAllowed}, |
| spare | BIT STRING (SIZE (1)) |
| } | |

In this example, the field "sl-offset" may not be included in the MIB, and the four least significant bits for the "pdcch-ConfigSIB1" field may not be transmitted. In this case, the MIB payload may be reduced to augment the detection performance of PBCH. In this example, a UE may, through blind detection, be able to differentiate between the legacy MIB and the MIB for unlicensed use. As above, however, the UE may be able to distinguish between the newly defined MIB and the legacy MIB without performing any blind detection since the use of one or the other is implicit on the carrier frequency adopted: in unlicensed spectrum operation, the newly defined MIB may always be used.

Instead, or in addition to altering the PBCH content, the SSB index may be changed. In this case, to signal to the UE more information to acquire correct time synchronization, the SSB index can be modified to allow to index additional positions within the half radio frame or the radio frame.

In legacy NR systems, 6 bits are used for SSB index signaling: 3 least significant bits (LSB) bits of the SSB index within the SS burst may be carried as part of the Demodulation Reference Signal (DMRS) sequence (8 different PBCH-DMRS sequences may be introduced), and 3 most significant bits (MSB) bits of the SSB index within the SS burst may be carried as part of the PBCH payload.

While in NR systems, the SSB may be composed of only 4 OFDM symbols (1 PSS, 1 SSS, and 2 PBCH), the DRS for NR-U systems in some embodiments may also include one or more of: the SSB, and additional time or frequency domain repetitions of the SSB, Channel State Reference Signals (CSI-RS), and/or the RMSI.

In this case, the 6 bits for the SS block index may not be fully used, leading to the 3 MSB bits or the 3 LBS bits of SS block index within the SS burst not being used to convey information.

Similar to the PBCH content adjustment above, in some embodiments, the 3 MSB bits of SS block index within the SS burst or the 3 LSB bits of SS block index within the SS burst may be used to indicate the number of slots the DRS has been shifted from a reference position. In some embodiments, this offset value may be evaluated using as a reference: 1) the boundary of the radio frame where the DRS is intended to be transmitted; 2) the boundary of the half radio frame where the SS block transmission is intended to be transmitted; or 3) the start of the DRS window, which occurs periodically and is fixed or configured via RRC signaling.

In some embodiments, the SSB block index may be extended from 6 bits to Z bits with Z>6 to be able to enumerate and indicate a larger set of locations within a DRS window. In some embodiments, the Z-6 additional bits may be carried in the PBCH content, and the 3 MSB bits of SS block index within the SS burst, may be extended to 3+Z-6 bits. In some embodiments, the Z-6 additional bits may be signaled in the PBCH-DMRS, and 2' additional DMRS sequences may be designed. In some embodiments, the Z-6 additional bits may be split between the PBCH content and the PBCH-DMRS.

In other embodiments, rather than changing the SS block index, the radio frame timing detection signal may be adjusted. In particular, a new sequence that may be used uniquely to perform radio frame timing detection may be used.

Figure 10:
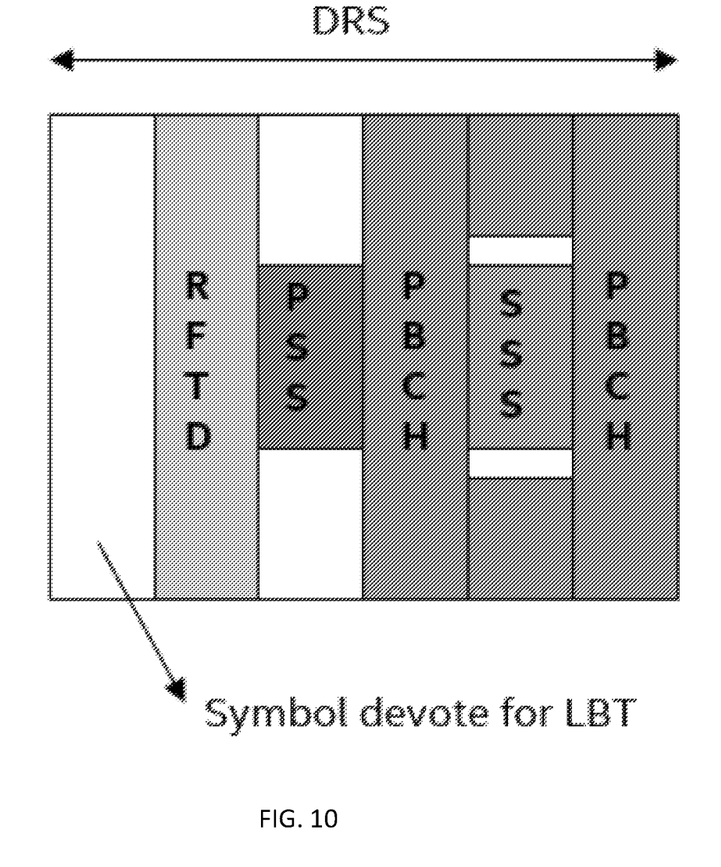
FIG. 10 illustrates an example of a radio frame timing detection (RFTD) signal in accordance with some embodiments.

Accordingly, in some embodiments, the radio frame timing detection (RFTD) signal may be appended to the start of the SSB transmission burst or to a DRS burst soon after the success of the LBT procedure. In other embodiments, the RFTD signal may be appended to the end of the SSB transmission burst or a DRS burst. FIG. 10 illustrates an example of a radio frame timing detection (RFTD) signal in accordance with some embodiments. As shown in FIG. 10, the RFTD is appended at the start of the SSB.

In some embodiments, to improve the misdetection performance of the RFTD signal, time-domain repetitions may be applied. In this case, the RFTD signal may be repeated for Y consecutive OFDM symbols, where Y may be predefined in the specification or configured by higher layers via NR MSI, NR RMSI, NR other system information (OSI) or RRC signaling.

In other embodiments, the RFTD signal may span the bandwidth of bandwidth part (BWP) for a given UE or the whole system bandwidth or a predefined bandwidth. If the BWP spans the whole system bandwidth, the UE may derive the RFTD signal within the configured BWP based on the location of BWP within the system bandwidth.

The RFTD signal may span Y symbols. The value of Y may be set to be 1, or selectable from the set of {1, 2, 3, 4, . . . N} symbols, corresponding to the remaining symbols within the slot performing Clear Channel Assessment (CCA) or extended CCA (eCCA). In some embodiments, Y can also have a fractional value rather than merely being limited to an integer value.

The RFTD signal structure may contain a sequence transmitted on the Y symbols. When the RFTD signal starts at a fractional symbol duration instead of symbol boundary, in some embodiments, the first partial symbol can be the "extended cyclic prefix (CP)" from the following symbol. Alternatively, the base station may transmit a reservation signal that may be transparent to the UE, and the RFTD signal may start at the following symbol boundary.

The sequence of the RFTD signal may be a Zadoff-Chu (ZC) sequence, a pseudorandom sequence, a Gold sequence, a Golay sequence, a computer-generated sequence, or an m-sequence. In some embodiments, a Gold sequence or ZC sequence with a specific root q may be used, in which the sequence may depend on the physical or virtual cell ID or be fixed. The sequence may be repeated in time domain over the multiple symbols over which the presence detection signal extends.

The RFTD signal may the same as that used in NR for the discovery signals. In some embodiments, the same signal used for PSS and/or SSS and/or DMRS used for PBCH may be reused as the RFTD signal. In some embodiments, a ZC sequence may be used and characterized by a specific cyclic shift. To cope with the intra-symbol and inter-symbol interference, an orthogonal cover code (OCC) such as a Barker or Hadamard code, can be applied.

In another embodiment, the entire sequence can extend over the entire length of the initial signal. This sequence may be composed by a ZC/Gold sequence/Golay sequence, pseudorandom sequence or alternatively a computer-generated sequence. In other embodiments, the sequence can be shorter, and each symbol may be composed by a shorter sequence repeated multiple times in the frequency domain.

In various embodiments, a length-31 Gold or ZC sequence or a length-127 m-sequence may be used. In various embodiments, cyclic shifts, intra-symbol and/or inter-symbol OCC may be applied. The configuration of the sequence, including the base sequence, cyclic shift, and/or OCC may be predefined.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. A method, comprising:
enumerating a number of Synchronization Signal/Physical Broadcast Channel (SS/PBCH) block transmission opportunity occasions in a periodic discovery window in a shared spectrum channel access, wherein the number of SS/PBCH block transmission opportunity occasions for shared spectrum is larger than a number for legacy new radio (NR) systems within a half frame; and
transmitting one or more SS/PBCH block transmissions for a user equipment (UE) time synchronization procedure in one or more of the number of SS/PBCH block transmission opportunity occasions.

2. The method of claim 1, wherein the number of SS/PBCH block transmission opportunity occasions result in an increase of a number of demodulation reference signal (DMRS) sequences.

3. The method of claim 1, wherein the number of SS/PBCH block transmission opportunity occasions for the one or more SS/PBCH block transmissions for shared spectrum is larger than the number for legacy NR systems within a half radio frame in order to accommodate unused SS/PBCH block transmission opportunity occasions due to base station channel access.

4. The method of claim 1, wherein for legacy NR systems:
synchronization signal blocks (SSBs) that comprise at least one of a primary synchronization signal (PSS) and a secondary synchronization signal (SSS) and PBCH are transmitted at specific instances in time and with given periodicities, and
one or more SS/PBCH blocks correspond to a SS/PBCH block index in which three least significant bits of the SS/PBCH block index are carried as part of a demodulation reference signal (DMRS) sequence and three most significant bits of the SS/PBCH block index are carried as part of a physical PBCH payload.

5. The method of claim 1, wherein one or more SS/PBCH blocks correspond to a SS/PBCH block index in which three least significant bits or three most significant bits of the SS/PBCH block index indicate an offset of the one or more SS/PBCH block transmissions from a reference position.

6. The method of claim 5, further comprising:
determining the offset from the one or more SS/PBCH blocks, wherein the offset is from one of: a boundary of a radio frame in which the one or more SS/PBCH blocks is to be transmitted, a boundary of a half radio frame in which the one or more SS/PBCH blocks is to be transmitted, or a start of the periodic discovery window.

7. The method of claim 5, wherein the one or more SS/PBCH blocks comprise a master information block (MIB), and wherein the method further comprises determining the offset from a field in the MIB.

8. The method of claim 7, wherein the offset is explicitly carried in the MIB through a specific field designated to indicate only the offset.

9. The method of claim 8, wherein a specific SS/PBCH block transmission opportunity occasion in which the SS/PBCH block transmission occurs of the number of SS/PBCH block transmission opportunity occasions within the discovery window is indicated explicitly in the MIB through the specific field.

10. The method of claim 5, wherein the SS/PBCH block index comprises an additional number of bits to indicate one of a plurality of offsets within the periodic discovery window, and wherein a total number of bits in the SS/PBCH block index is larger than six.

11. The method of claim 10, wherein the additional number of bits are carried in physical broadcast channel (PBCH) content of the one or more SS/PBCH blocks.

12. The method of claim 10, wherein the additional number of bits are carried in a physical broadcast channel demodulation reference signal (PBCH-DMRS) of the one or more SS/PBCH blocks, and $2^{Z-6}$ additional DMRS sequences are used to indicate the offset, where Z is the total number of bits.

13. The method of claim 10, wherein the additional number of bits are split between being carried in physical broadcast channel (PBCH) content of the one or more SS/PBCH blocks and being carried in a physical broadcast channel demodulation reference signal (PBCH-DMRS) of the one or more SS/PBCH blocks.

14. A method, comprising:
performing time synchronization with a base station (BS) for shared spectrum channel access, that includes:
monitoring one or more Synchronization Signal/Physical Broadcast Channel (SS/PBCH) block transmission opportunity occasions in a periodic discovery window in the shared spectrum channel access for one or more SS/PBCH block transmissions from the base station, wherein a number of SS/PBCH block transmission opportunity occasions for the one or more SS/PBCH block transmissions for shared spectrum is larger than a number for legacy new radio (NR) systems within a half frame; and
performing the time synchronization procedure with the base station based on the one or more SS/PBCH transmissions.

15. The method of claim 14, wherein one or more SS/PBCH blocks have an SS/PBCH block index in which three least significant bits or three most significant bits of the SS/PBCH block index indicate an offset of the SS/PBCH block transmission from a reference position.

16. The method of claim 14, wherein one or more SS/PBCH blocks have a SS/PBCH block index in which three least significant bits or three most significant bits of the SS/PBCH block index indicate an offset of the one or more SS/PBCH block transmissions from a reference position.

17. The method of claim 16, wherein the SS/PBCH block index comprises an additional number of bits to indicate one of a plurality of offsets within the periodic discovery window, and wherein a total number of bits in the SS/PBCH block index is larger than six.

18. An apparatus, comprising:
at least one processor configured to a cause a base station (BS) to
enumerate a number of Synchronization Signal/Physical Broadcast Channel (SS/PBCH) block transmission opportunity occasions in a periodic discovery window in a shared spectrum channel access, wherein the number of SS/PBCH block transmission opportunity for shared spectrum is larger than a number for legacy new radio (NR) systems within a half frame; and transmit one or more SS/PBCH transmissions for a user equipment (JE) time synchronization procedure in one or more of the number of SS/PBCH block transmission opportunity occasions.

19. The apparatus of claim 18, wherein the number of SS/PBCH block transmission opportunity occasions result in an increase of a number of demodulation reference signal (DMRS) sequences.

20. The apparatus of claim 18, wherein one or more SS/PBCH blocks have a SS/PBCH block index in which three least significant bits or three most significant bits of the SS/PBCH block index indicate an offset of the one or more SS/PBCH block transmissions from a reference position.

* * * * *

UNITED STATES PATENT AND TRADEMARK OFFICE
CERTIFICATE OF CORRECTION

Page 1 of 1

PATENT NO. : 11,696,224 B2
APPLICATION NO. : 17/583929
DATED : July 4, 2023
INVENTOR(S) : Salvatore Talarico et al.

It is certified that error appears in the above-identified patent and that said Letters Patent is hereby corrected as shown below:

In the Claims

Column 17, Line 8, delete "(JE)" and substitute --(UE)--.

Signed and Sealed this
Twenty-fourth Day of October, 2023

Katherine Kelly Vidal
*Director of the United States Patent and Trademark Office*